March 29, 1932.    P. B. SHEE    1,851,527
SEPARATOR
Filed April 5, 1930    2 Sheets-Sheet 1
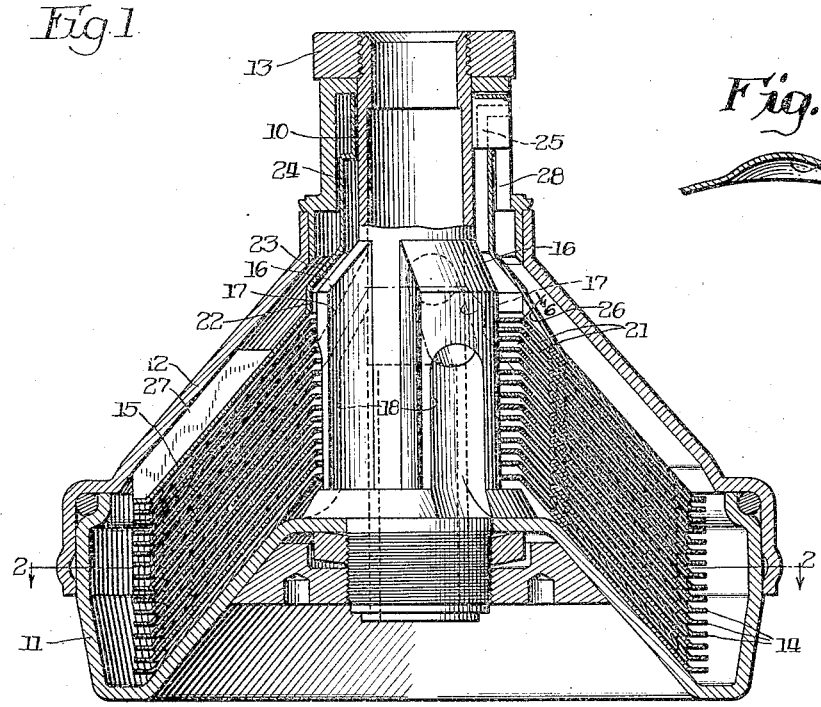
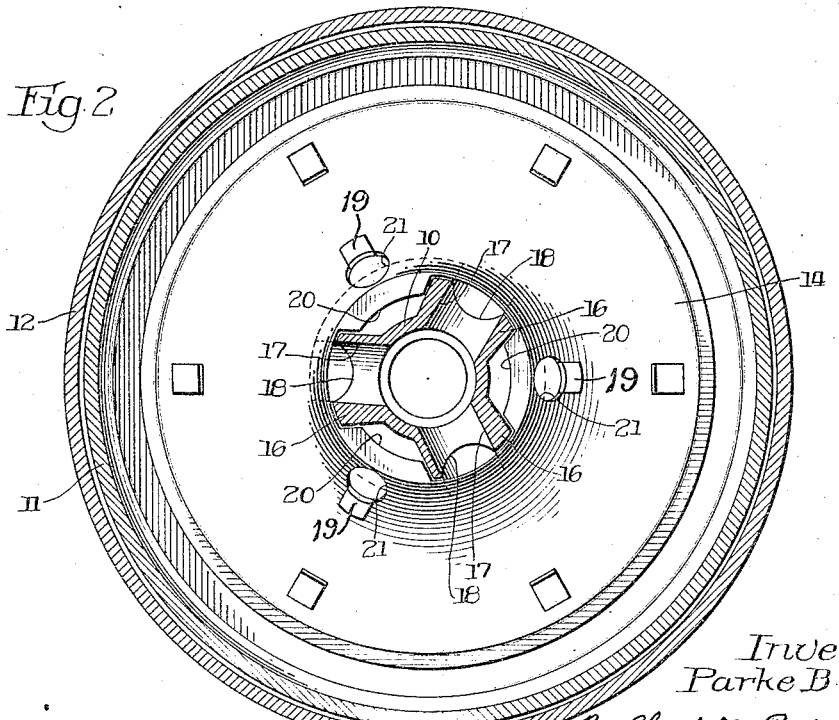
Inventor
Parke B. Shee
By Chindahl, Parker & Carlson
Attys March 29, 1932.   P. B. SHEE   1,851,527
SEPARATOR
Filed April 5, 1930   2 Sheets-Sheet   2

Inventor:
Parke B. Shee.
By Chindahl, Parker + Carlson
Attys.

Patented Mar. 29, 1932

1,851,527

UNITED STATES PATENT OFFICE

PARKE B. SHEE, OF OAK PARK, ILLINOIS, ASSIGNOR TO SEARS, ROEBUCK AND CO., OF CHICAGO, ILLINOIS, A CORPORATION OF NEW YORK

SEPARATOR

Application filed April 5, 1930. Serial No. 441,789.

The invention relates to centrifugal separators, and the general object of the invention is to provide an improved separator which effects a thorough separation of the different portions of the liquid.

A further object is to provide such a separator which eliminates the necessity of separated portions passing back through the incoming unseparated portions in order to pass out from the machine.

Another object is to provide such a separator having a plurality of radially spaced passages for leading off the separated portion as soon as it is separated.

Still another object is to provide such a separator having a plurality of channels permitting the incoming liquid to flow directly to the disk on which separation of that portion of the liquid takes place without having to pass through the other disks.

A still further object is to provide a novel method for separating different constituents of a liquid.

Other objects and advantages will become apparent from the following description taken in connection with the accompanying drawings, in which:

Figure 1 is a vertical section through a separator bowl assembly embodying the features of the invention.

Fig. 2 is a horizontal section taken along the line 2—2 of Fig. 1.

Fig. 6 is a fragmentary section taken along the line 6 of Fig. 1.

Figure 3:
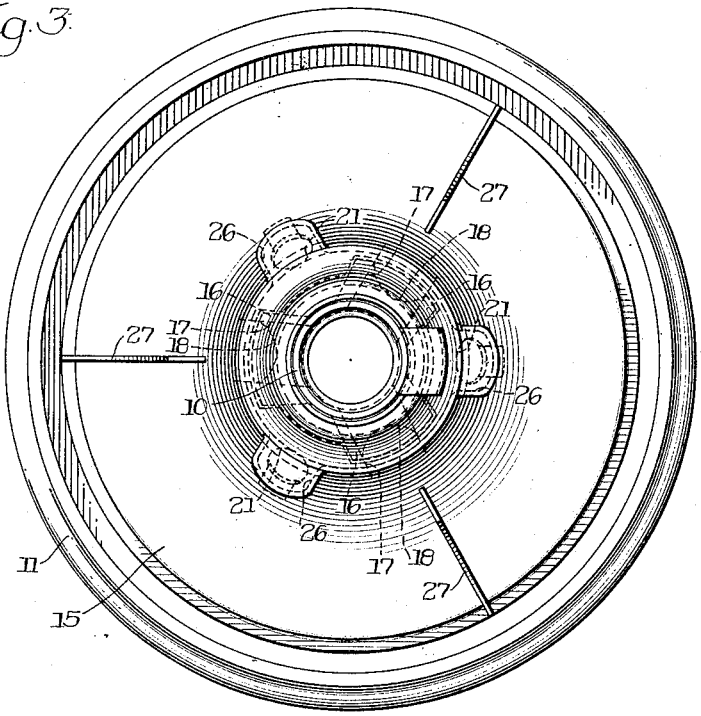
Fig. 3 is a plan view of the bowl assembly with the bowl cover removed.
Figure 4:
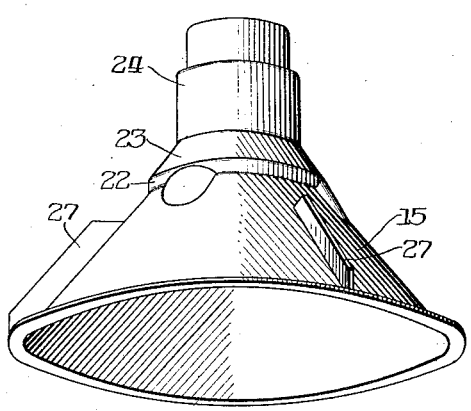
Fig. 4 is a reduced perspective view of the dividing disk.
Figure 5:
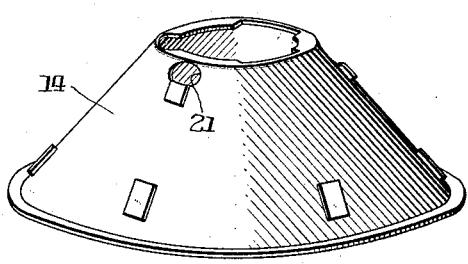
Fig. 5 is a reduced perspective view of one of the skimming disks.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

While the invention is adapted for separating the lighter and heavier constituents of various liquids, for purposes of clarity it is described herein as being used for separating cream and skim-milk.

In a centrifugal cream separator, the bowl assembly is adapted to be mounted on the upper end of a drive shaft and to be rotated at a high, constant speed thereby. In the cream separator constituting the present invention, the bowl assembly comprises in general a central stem, a plurality of skimming disks surrounding said stem, means formed on said stem for introducing the whole-milk directly therefrom to each disk, and two sets of cream exit passages through said disks, said sets being radially spaced from each other, one to catch the cream easily separated and the other to catch the cream less easily separated in order to prevent it passing back through the incoming whole-milk.

As shown in the drawings, a stem 10 is provided which is tubular in form and open at its top. A bowl 11 having a conical bottom and upturned sides is rigidly attached to the lower end of the stem so that the latter projects centrally upward from the bottom of the bowl 11. The stem 10 is adapted to be seated upon and driven by a shaft (not shown) running at a high rotative speed. A bowl cover 12 having a conical shape is adapted to close the bowl 11 with a liquid-tight seal therebetween and to be rigidly held in place by a nut 13 threaded to the top of the stem.

Within the bowl 11 there are a plurality of conical skimming disks 14 (see Fig. 1) centrally apertured to surround the stem 10 and held in axially spaced relation to each other. Covering the skimming disks 14 is a dividing disk 15 which, in conjunction with the stem 10 and with the bowl cover 12, provides separate paths for the cream and skim-milk respectively to follow in passing out of the bowl.

The stem 10 being tubular and open at its top forms an inlet through which whole-milk may be introduced to the bowl. On the side of the stem, a plurality of radially extending wings 16 are formed (see Figs. 1 and 2), each of which, at its upper end, has a radial orifice 17 communicating with the interior of the stem. A groove or channel 18 having a wide opening extending its full length is cut in each wing 16 extending axially downward from the orifice 17 past all of the skimming disks 14. Thus, the whole-milk may pass from the interior of the stem through the orifices 17 and down in the channels 18 freely and without restriction to each skimming disk 14.

The edges of the central apertures in the skimming disks are notched to fit closely around the wings 16 (see Fig. 2), one wing being larger than the others so that the skimming disks will always be assembled in the same relation to the stem. The apertures are of such diameter that the edges thereof are radially spaced from the main body of the stem to form gaps 20 therebetween constituting a first set of cream exit passages. Thus, said cream exit passages are angularly spaced from the orifices 17 and are closer to the axis of rotation than the outer ends of said orifices.

Each skimming disk is provided with a plurality of holes 21 punched in the disk at points angularly spaced from the orifices 17 and farther from the axis of rotation than the outer end of said orifices, the holes 21 in each disk being alined with those in the other disks. Thus, a second set of cream exit passages is formed which is radially spaced from said first set.

A portion of the metal punched out of each hole 21 is left attached to the outer edge of the hole and is bent back onto the upper surface of the disk to provide a caulk 19 by which the disks are held in their spaced relation. Caulks adjacent the outer edges of the disks may be provided as by welding small pieces of metal to the upper surfaces of the disks.

In separating cream from the skim-milk, the whole-milk passes onto the skimming disks 14 from the channels 18, and the cream easily separated, being light in weight, will immediately lag behind the channel from which it came and be forced radially inward around the following edges of the wings, where it is caught in the first set of cream exit passages. The cream less easily separated, having already passed part way out to the periphery of the skimming disks before it is separated, and being light in weight, lags behind the incoming whole-milk and is caught by the second set of cream exit passages, the skim-milk passing on out to the periphery of the disks. Thus, none of the cream has to pass back through the incoming stream of whole-milk and a large part of the separation may take place close to the wings.

The dividing disk 15, which covers the skimming disks, is formed with a first cylindrical portion 22 capping the main conical part and a smaller conical portion 23 whose upper end blends above the wings 16 into a second cylindrical portion 24 which is radially spaced from the stem to form therewith a path to an outlet 25 for the cream.

At points immediately above the holes 21 in the skimming disks (see Fig. 3), a plurality of downwardly opening grooves 26 are formed in the dividing disk, by placing a bulge in the metal, to extend from above said holes radially inward to provide a duct by which the cream from the second set of cream exit passages may be led to a point where it joins the cream flowing from the first set of cream exit passages and thence passes to the cream outlet 25.

The dividing disk is also provided with a plurality of members 27 which hold it in spaced relation to the bowl cover 12 forming therewith a passage from the portion of the bowl beyond the periphery of the skimming disks through which the skim-milk may flow to an outlet 28.

It is evident from the above description that I have provided a separator which has a plurality of radially spaced exit passages for the lighter constituents of a liquid eliminating the necessity of said constituent passing back through the incoming stream of unseparated liquid in order to pass from the machine, which has a plurality of channels permitting the incoming unseparated liquid to flow directly to the disk on which the separation takes place without having to pass through other disks, and which, by reason thereof, effects a thorough separation of the lighter constituents from the heavier constituents.

I claim as my invention:

1. A centrifugal separator comprising, in combination, a tubular stem forming an inlet for unseparated liquid and having a plurality of orifices extending radially from said inlet, a plurality of axially spaced disks surrounding said stem, said disks having portions of their inner edges radially spaced from said stem to form a first set of exit passages for the lighter constituent, and having alined holes radially spaced from said portions forming a second set of exit passages for the lighter constituent, and a dividing disk covering said disks and radially spaced from said stem to form an outlet from said first set of exit passages, said dividing disk having downwardly opening radial grooves overlying said holes to provide ducts whereby the lighter constituent from said second set of exit passages may pass to the outlet of said first set of exit passages.

2. In a centrifugal separator, a tubular stem through which unseparated liquid may be introduced, a plurality of axially spaced disks surrounding said stem and radially spaced therefrom to form a first set of exit passages for the lighter constituent therebetween, said disks having a plurality of alined holes forming a second set of exit passages for the lighter constituent radially spaced from said first set, and a dividing disk overlying said disks and spaced from said stem to form an outlet for the lighter constituent from said first set of exit passages, said dividing disk having grooves opening downwardly over said holes in said disks and extending radially therefrom to said outlet to permit the lighter constituent from said second set of exit passages to pass to said outlet.

3. In a centrifugal separator, the combination of a bowl, a stem through which unseparated liquid may be introduced centrally of said bowl, a plurality of separating disks mounted in said bowl and having alined holes radially spaced from said stem and constituting a set of exit passages for the lighter constituent, and a dividing disk overlying said separating disks and having radial grooves opening downwardly over said holes to form an outlet for the lighter constituent from said exit passages.

4. A centrifugal separator comprising, in combination, a bowl, a plurality of separating disks each having a plurality of radially spaced passages at different distances from the axis of the disks, and acting to carry off different portions of the lighter constituent as it is separated, and means adjacent the ends of said passages for permitting free egress of the lighter constituent from all of said passages, including an enlarged duct communicating with the passages at the greatest distance from the axis.

5. A centrifugal cream separator having a plurality of separating disks each having an inner passage for one portion of the separated cream and outer openings at a greater radial distance from the axis of the disks for another portion of the separated cream, and a dividing disk covering said disks and having an outlet neck leading from said inner passages and also having grooves connecting said outer openings with said neck.

In testimony whereof, I have hereunto affixed my signature.

PARKE B. SHEE.